(12) United States Patent
Kang et al.

(10) Patent No.: US 7,379,676 B2
(45) Date of Patent: May 27, 2008

(54) COMMUNICATION APPARATUS IN ETHERNET PASSIVE OPTICAL NETWORK

(75) Inventors: Ho Yong Kang, Daejeon (KR); Tae Whan Yoo, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 773 days.

(21) Appl. No.: 10/724,554

(22) Filed: Nov. 25, 2003

(65) Prior Publication Data

US 2004/0109450 A1 Jun. 10, 2004

(30) Foreign Application Priority Data

Nov. 27, 2002 (KR) .................. 10-2002-0074354
Oct. 28, 2003 (KR) .................. 10-2003-0075638

(51) Int. Cl.
*H04B 10/00* (2006.01)

(52) U.S. Cl. .................. 398/168; 398/58; 370/400; 370/395.53; 370/392

(58) Field of Classification Search .......... 370/395.53, 370/400, 466, 392, 393, 401, 455, 389; 398/168, 398/58

See application file for complete search history.

(56) References Cited

U.S. PATENT DOCUMENTS 6,430,188 B1 8/2002 Kadambi et al.

2003/0190168 A1* 10/2003 Song et al. .................. 398/168
2003/0235205 A1* 12/2003 Song et al. .................. 370/466
2004/0057431 A1* 3/2004 Song et al. .................. 370/390

FOREIGN PATENT DOCUMENTS

KR 10-0280642 11/2000
KR 10-0303329 7/2001

OTHER PUBLICATIONS

EPON P2P Emulation and Dowstream Broadcase, Baseline Proposal, H. Suzuki, et al., IEEE 802.3 EFM Task Force, Mar. 2002.
Two Models for IEEE 802.3ah EPONs, Two Models for IEEE 802.3ah EPONs, N. Finn, Apr. 30, 2002, 14 pages.

* cited by examiner

*Primary Examiner*—Ricky Q. Ngo
*Assistant Examiner*—Kibrom T Hailu
(74) *Attorney, Agent, or Firm*—Blakely, Sokoloff, Taylor & Zafman LLP

(57) ABSTRACT

Provided is a communication apparatus in a PON bridge sublayer, which supports point-to-point communications between optical network units (ONU) in an Ethernet passive optical network (EPON). To support point-to-point communications between ONUs in the EPON, the communication apparatus in the PON bridge sublayer includes a second processing portion, a second input queue, a second lookup and learning portion, a second output queue, a first input queue, a first lookup and learning portion, a filtering database table a VLAN ID table, a table control portion, a first output queue, and a first processing portion.

10 Claims, 11 Drawing Sheets

{Root Bridge ID, Path Cost, Bridge ID}

COMMUNICATION APPARATUS IN ETHERNET PASSIVE OPTICAL NETWORK

CROSS REFERENCE TO RELATED APPLICATION

This application claims the priority of Korean Patent Application Nos. 2002-74354 and 2003-75638, filed on Nov. 27, 2002 and Oct. 28, 2003, respectively, in the Korean Intellectual Property Office, the disclosures of which are hereby incorporated by references in their entirety.

BACKGROUND OF THE INVENTION

1. Field of the Invention

The present invention relates to a communication apparatus in an Ethernet passive optical network (EPON), and more particularly, to an EPON bridge sublayer for supporting point-to-point communications between optical network units (ONUs) in the EPON.

2. Description of the Related Art

An EPON is a passive optical subscriber network technology that is designed to apply Ethernet used in the existing local area network (LAN) to a general subscriber network. The EPON is a point-to-multipoint network that is formed of a PON that a number of ONUs located at the subscriber side are passively connected to an optical line termination (OLT) at the network side through a passive splitter.

The EPON is a shared media topology with a tree-like structure. Unlike media sharing in the existing Ethernet, due to characteristics of an optical path and the passive splitter, a downstream frame from the OLT to an ONU is transmitted to all ONUs. An upstream frame transmitted from an ONU has a transmission direction, such that it cannot be received by any other ONU, but can be only received by the OLT. Also, an Ethernet frame is used to perform communications between the OLT and the plurality of ONUs.

As a subscriber network solution, IEEE 802.3ah Ethernet in the First Mile (EFM) Task Force has been working toward standardization for the EPON.

Ethernet employing carrier sense multiple access/collision detect (CSMA/CD) allows a terminal connected to shared media and point-to-point links to directly communicate with another terminal. In "native mode" PON, broadcasting is performed in a downstream direction and point-to-point transmissions between an OLT and ONUs are performed based on time division multiple access (TDMA) in an upstream direction. However, when an IEEE 802.1D spanning tree is used in the PON, a loop is inadvertently generated.

In the PON, in order for an ONU to transmit a frame to another, an OLT has to look at a destination address of the frame and relay the frame to a destination ONU. However, according to the existing Ethernet standards, the OLT cannot return a received frame to an ONU and an ONU occurs the problem that a media access control (MAC) frame is input to an ONU again through a port which the ONU outputs the MAC frame.

SUMMARY OF THE INVENTION

The present invention provides the architecture of a PON bridge layer, which can support both point-to-point communications between ONUs and virtual LAN (VLAN) multicasting while complying with IEEE 802.1D standards in an EPON.

According to an aspect of the present invention, there is provided a communication apparatus comprising: an emulation sublayer, which extracts logical link identification (LLID) information from a preamble included in a frame; and a passive optical network (PON) bridge sublayer, which creates and manages a filtering address table for a destination media access control (MAC) address and a virtual LAN (VLAN) ID in response to the LLID information, determines whether to forward the frame to the upper layer of the PON bridge sublayer or to reflect the frame toward an optical network unit (ONU), and provides point-to-point communications between a plurality of ONUs connected to the EPON and VLAN multicasting.

Through this architecture, it is possible to solve such problems as no support for communications between ONUs and incompatibility with an 802.1D bridge.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
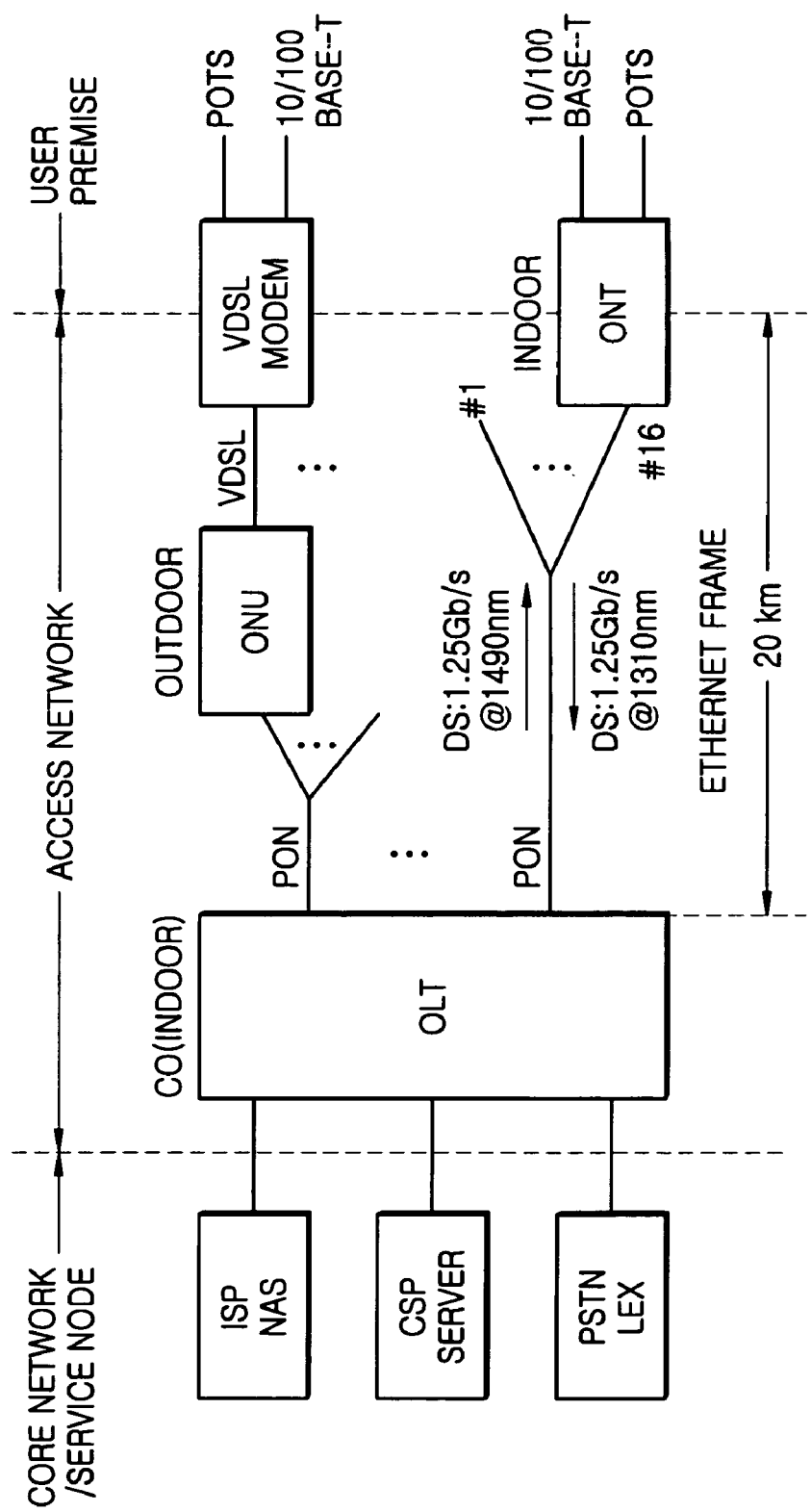
FIG. 1 is a structural diagram of an Ethernet access network to which the present invention is applied.

The present invention will now be described more fully with reference to the accompanying drawings, in which preferred embodiments of the invention are shown. In the drawings, like reference numerals are used to refer to like elements throughout.

Prior to a description of the present invention, the architecture of an Ethernet access network to which the present invention is applied will be described with reference to FIGS. 1 through 5.

FIG. 1 illustrates the architecture and characteristics of the Ethernet access network to which the present invention is applied.

There is a tendency to integrate all services into an IP network. An EPON subscriber network applies to a PON subscriber network an Ethernet data link that transfers IP packets most effectively.

An OLT is located in a communication company's office (e.g., a telephone office) at the network side. An ONU is located outdoors near subscribers. A plurality of subscribers access the ONU via the existing telephone lines, coaxial cables, or short range radio communications, thus forming a fiber to the curb (FTTC) optical subscriber network. An optical network terminal (ONT) is installed within the subscriber's premises and forms a fiber to the home (FTTH) optical subscriber network.

Figure 2:
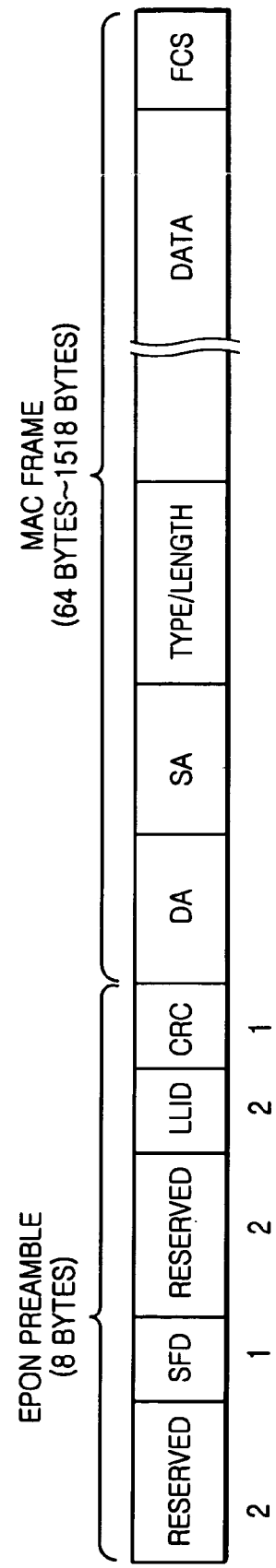
FIG. 2 illustrates a format of an EPON frame according to an embodiment of the present invention.

As will be described in detail later, in the present invention, in order to make EPON system appear as several point-to-point links in a point-to-multipoint communication environment and thus to maintain compatibility with an IEEE 802.1D bridge, the existing Ethernet preamble is replaced with an EPON preamble of 8 bytes including a logical link identification (LLID), as shown in FIG. 2, that corresponds to an ONU ID.

Figure 3:
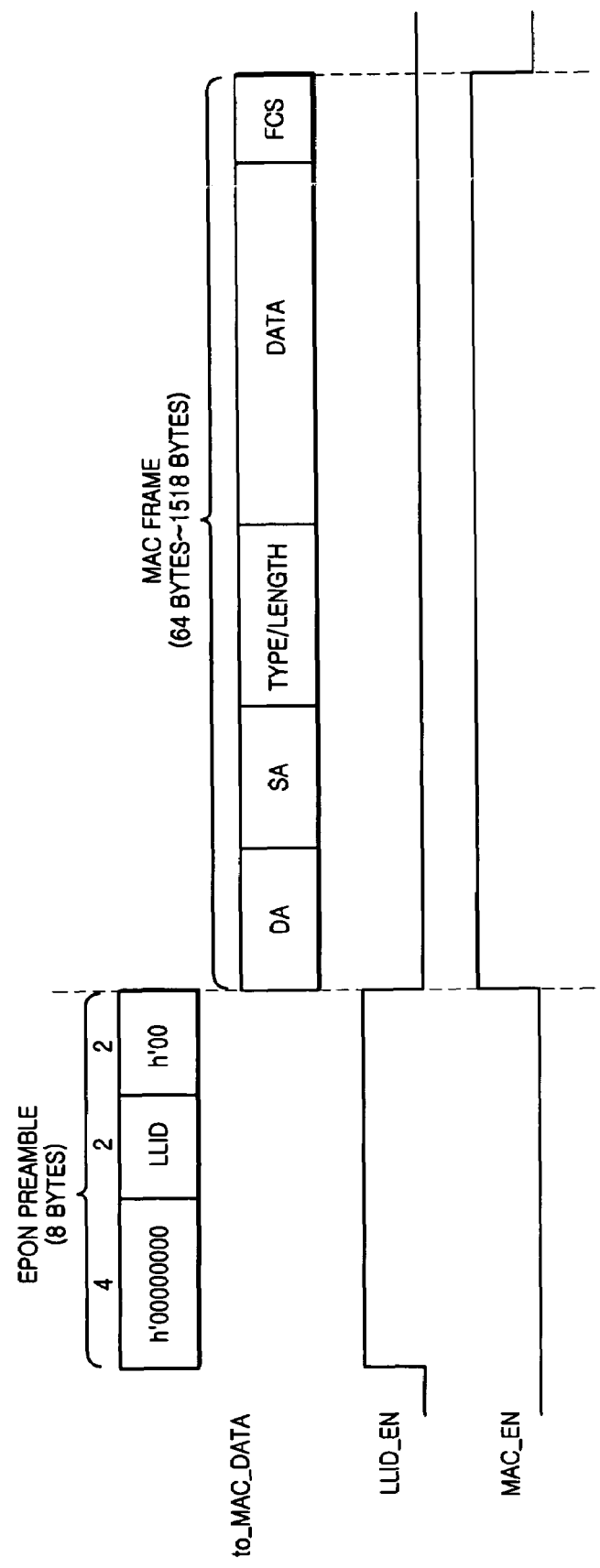
FIG. 3 illustrates a structure of an EPON frame and control signals according to another embodiment of the present invention.

FIG. 2 illustrates a format of an EPON frame according to an embodiment of the present invention, and FIG. 3 illustrates a format in which the LLID is extracted from an EPON preamble of an EPON frame according to another embodiment of the present invention.

Referring to FIGS. 2 and 3, the EPON frame consists of the EPON preamble of 8 bytes and a MAC frame of 64-1518 bytes. In a downstream direction, the LLID included in the EPON preamble indicates an ONU for which a corresponding frame is intended. In an upstream direction, the LLID indicates an ONU that transmits the corresponding frame.

The most significant bit (MSB) of the LLID is assigned to a mode bit, thus creating a PON-tag. When the mode bit is '1', the PON-tag indicates broadcasting. When the mode bit is '0', the PON-tag indicates point-to-point emulation. The LLID is 16 bits (i.e., 2 bytes) and is assigned to a corresponding ONU by an OLT when the corresponding ONU is registered in the OLT. When the LLID is not 'FFFF' and its MSB is '1', such an LLID indicates an anti-LLID. This anti-LLID is used in frame transmission in the downstream direction and means "all except for a specific LLID". When the LLID is 'FFFF', it indicates a broadcast LLID and a frame from an OLT can be received by all of ONUs connected to the OLT.

Figure 4:
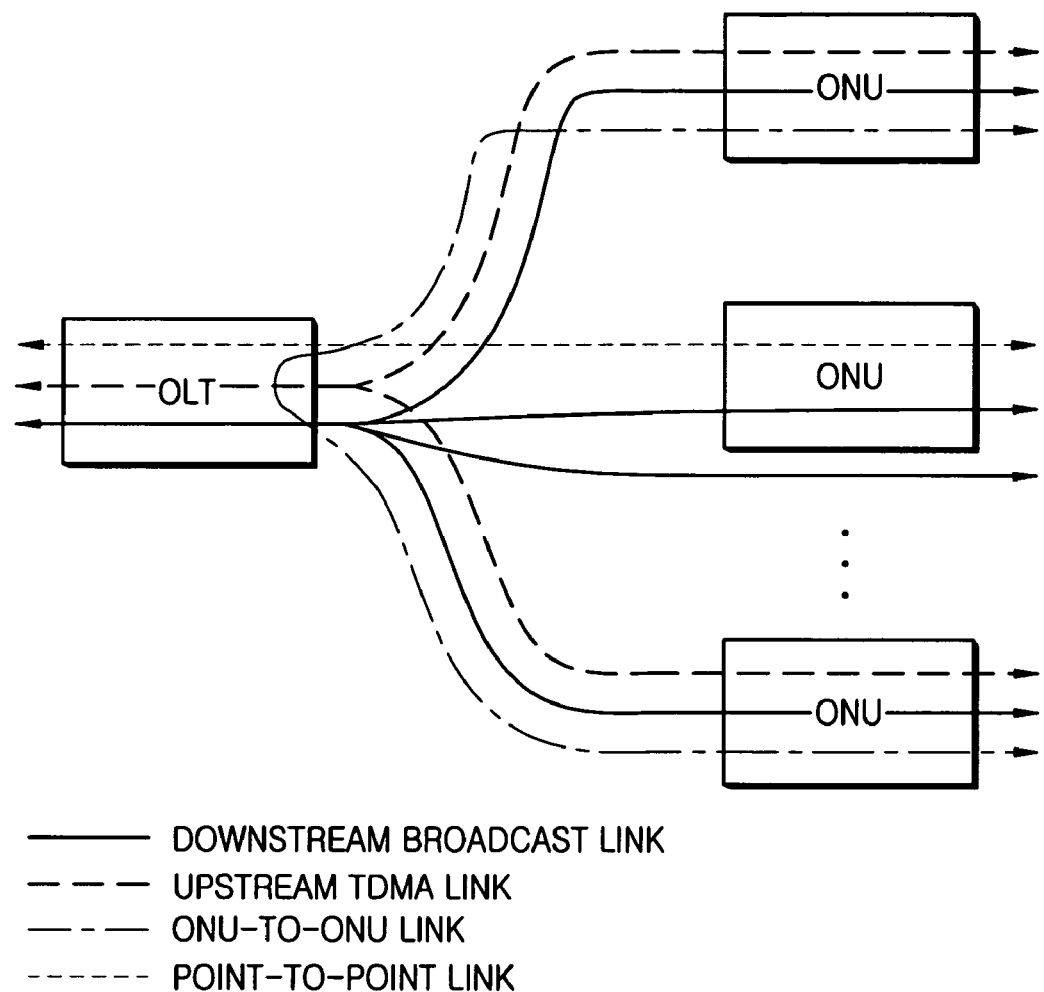
FIG. 4 illustrates an exemplary data link in an EPON.

In the present invention, an ONU-to-ONU link uses an upstream LLID and a downstream anti-LLID. By using these LLIDs, the EPON system is recognized as several point-to-point links in the point-to-multipoint communication environment, thereby being compatible with an upper bridge. For example, when an ONU uploads a frame that is intended for another ONU, the frame is supposed to be transmitted only to a destination ONU. In this case, a downstream LLID that is different from a received upstream LLID is used. Thus, although a frame is actually received and transmitted through the physically same path, the bridge side operates as if the frame is forwarded through another path. A data link using these LLIDs, which is efficient in the EPON, is shown in FIG. 4.

IEEE 802.1D is established on the assumption that a network consists of point-to-point LANs and shared LANs connecting a plurality of end stations and bridges. End stations originate and receive data frames. Bridges relay those frames from LAN to LAN in order to deliver each data frame to at least that station to which it is addressed. At this time, if it is not necessary to reach the end station to which it is addressed, bridges conserve bandwidth by not transmitting any data frame to any LAN. Also, in case of doubt as to which end station a data frame is intended for, a bridge gives preference to connectivity over bandwidth conservation. As a result, the bridge transmits an excessive amount of data frames.

To meet the definition of a shared LAN expected by the IEEE 802.1D bridge, the OLT must reflect all of multicast or broadcast frames received from any ONU, except for unicast frames intended for another ONU. Considering connection failures in bridges or LANs, most bridged LAN networks incorporate redundancy. That is, there is a plurality of physical paths available between destination stations and source stations for most data frames. However, if every bridge just floods all received data frames on all LANs, each data frame would be endlessly duplicated due to theses redundant paths. In order to avoid such a meltdown, the IEEE 802.1D bridge forms a spanning tree over the entire physical topology.

Figure 5:
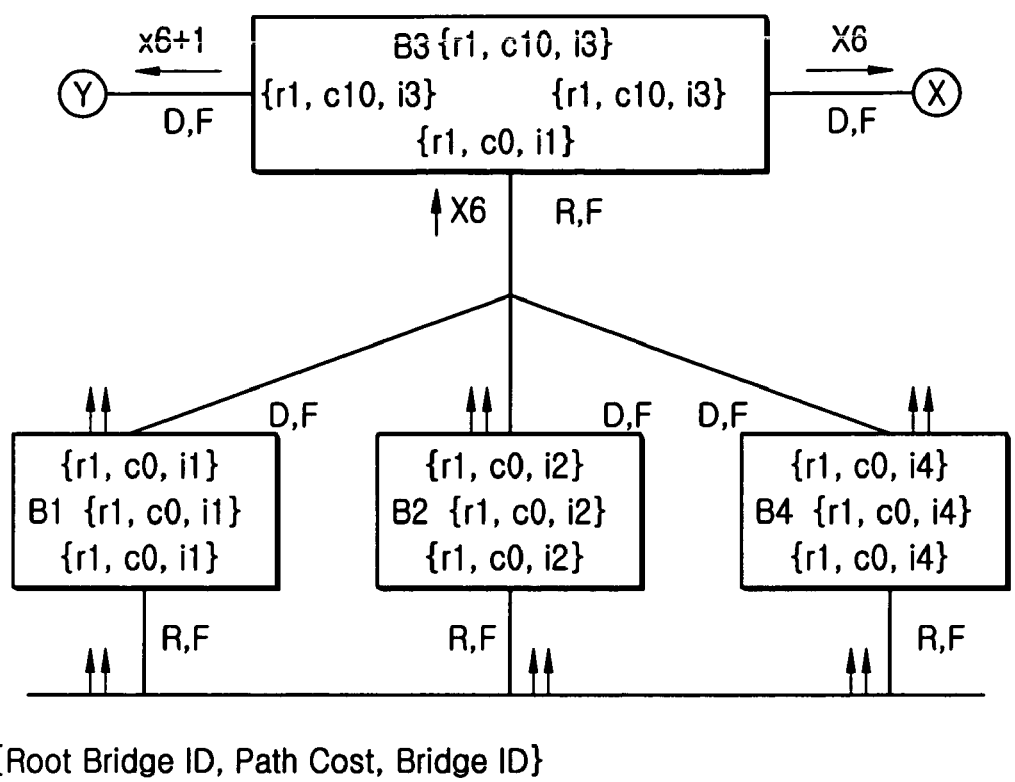
FIG. 5 illustrates incompatibility with 802.1D in PON "native mode"

FIG. 5 illustrates incompatibility with 802.1D in PON "native mode".

Referring to FIG. 5, each ONU is connected to a LAN through another path. A loop is shown in FIG. 5, which is caused by applying a spanning tree protocol (STP) when ONU1 (B1) is a root bridge. In this case, when a broadcast frame is transmitted, duplication of the broadcast frame is repeated and broadcast frames are flooded, resulting in incompatibility with a STP function of the root bridge.

Below is a description of a scheme for implementing a PON bridge function in spite of the above-mentioned restrictions the EPON has, so that the PON bridge function can support point-to-point communications between ONUs while conforming to IEEE 802.1D standards in the EPON.

Figure 6:
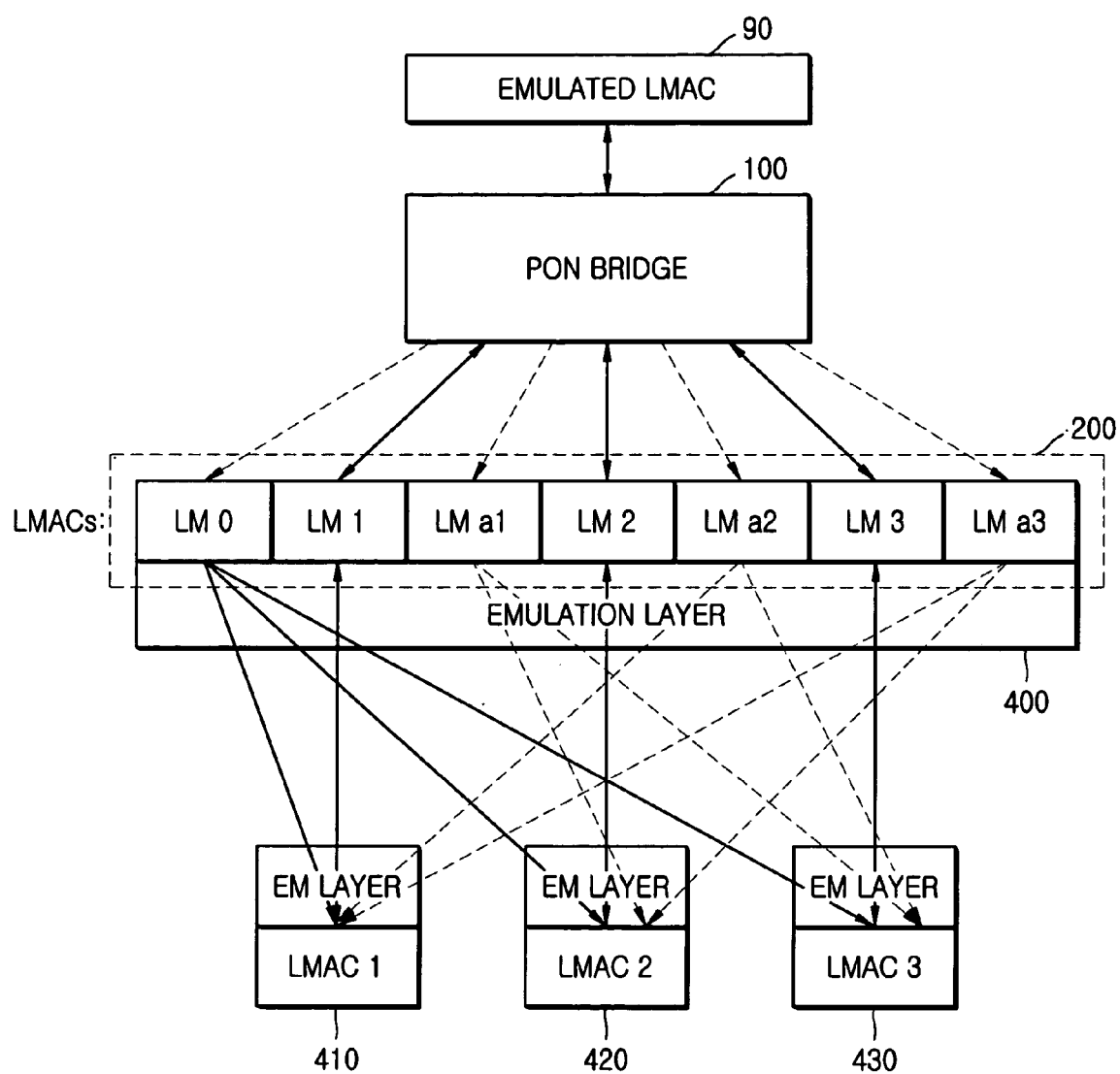
FIG. 6 illustrates the architecture of shared LAN emulation for implementing a function of a PON bridge according to a preferred embodiment of the present invention.

FIG. 6 illustrates the architecture of shared LAN emulation for implementing the PON bridge function according to a preferred embodiment of the present invention.

Referring to FIG. 6, the shared LAN emulation is comprised of a PON bridge 100, a logic MAC layer 200, and an emulation layer (EL) 400. The emulation layer 400 sees an LLID of a frame received from an ONU and transmits the same frame to the logical MAC layer 200. The logical MAC layer 200 performs MAC on the received frame and then passes the resulting frame to an upper layer, i.e., the PON bridge 100.

The emulation layer 400 receives an LLID that is obtained through auto discovery procedures by which resources for network equipment resource management are automatically created in a multi-point control protocol (MPCP). After that, the emulation layer 400 stores the received LLID in an Update_LLID register 410, 420, or 430. When a frame is transmitted, the emulation layer 400 receives a MAC frame from the logical MAC layer 300 and creates the EPON preamble of 8 bytes shown in FIG. 2 or 3, using the LLID stored in the Update_LLID register 410, 420, or 430.

In case of the EPON preamble shown in FIG. 2, the EPON preamble consists of 1-byte start frame delimiter (SFD) data, 4-byte reserved data, 2-byte LLID data, and 1-byte cyclic redundancy check (CRC) data. Creation of the CRC data for the EPON preamble is calculated using CRC-8. The created EPON preamble is inserted in front of the MAC frame and transmitted to a physical coding sublayer (PCS) through a gigabit media independent interface (GMII).

Going back to FIG. 6, when a frame is received, the emulation layer 400 receives a frame to which the EPON preamble including the LLID is attached, performs a CRC test on the EPON preamble, and extracts the LLID from the EPON preamble. When a CRC error does not occur in the EPON preamble, the extracted LLID is compared to the broadcast LLID, the anti-LLID, and the LLID stored in the Update_LLID register 410, 420, or 430 and LLID filtering is performed.

For example, if the extracted LLID is the broadcast LLID or identical to the LLID stored in the Update_LLID register 410, 420, or 430, the emulation layer 400 of an ONU unconditionally recognizes the receipt of the frame as success. If the extracted LLID is the anti-LLID and the lower 15 bits of the LLID stored in the Update_LLID register 410, 420, or 430 are identical to the lower 15 bits of the extracted anti-LLID, the emulation layer 400 discards the received frame. If the lower 15 bits of the LLID stored in the Update_LLID register 410, 420, or 430 are different from the lower 15 bits of the extracted anti-LLID, the emulation layer 400 generates a hit. As a result of LLID comparison, the emulation layer 400 transmits the MAC frame to a MAC sub-block only when a hit is generated.

If the extracted LLID is not present in LLID tables of the entire ONUs, an emulation layer of an OLT discards a received frame if the extracted LLID is present in the LLID tables of the entire ONUs, the emulation layer of the OLT generates a hit and passes the LLID to its upper layer.

Figure 7:
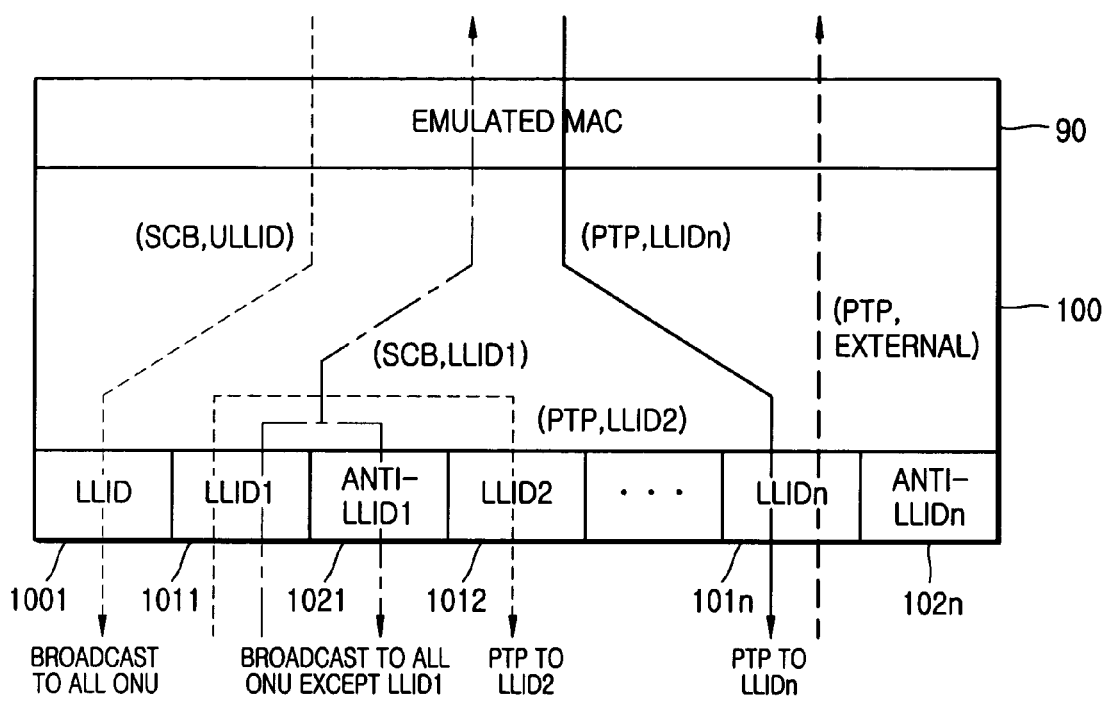
FIG. 7 is a view for explaining the operation of the PON bridge shown in FIG. 6.

FIG. 7 is a view for explaining the operation of the PON bridge 100 shown in FIG. 6.

Referring to FIG. 7, the function of the PON bridge 100 is a PON inherent bridge function that bi-directionally connects logical links to upper layers of the logical MAC layer 200. There are 2n+1 ports including n LLIDs (i.e., logic links) 1011, 1012, ..., 101n, n anti-LLIDs 1021, 1022, ..., 102n, and a broadcast port, i.e., 1 universal LLD (ULLID) 1001 at the PON side. Here, an Ethernet frame having an anti-LLID indicates a link that is not received by an ONU corresponding to the anti-LLID, but is received by any other ONU. When an ONU generates a broadcast frame, this ONU transmits the broadcast frame to the OLT and, at the same time, transmits the same broadcast frame to other ONUs, thereby allowing all ONUs to receive the broadcast frame. The ULLID 1001 is a port through which a frame received from the upper layers is received by all of the ONUs in a PON. Thus, when a frame including the ULLID 1001 as an identifier is transmitted in the downstream direction, all of the ONUs receive the frame.

In FIG. 7, all available frame transmission paths are illustrated. The frame transmission paths indicated by arrows can be recognized by analyzing each port (i.e., each LLID). To this end, like the IEEE 802.1D bridge, the PON bridge 100 performs learning and lookup functions on an MAC address and an LLID. To reinforce a VLAN multi-casting function and security, the PON bridge 100 performs learning and lookup functions for VLAN table management.

When receiving a frame from the logical MAC layer 200, the PON bridge 100 checks a VLAN tag of the frame, stores the frame in the maximum 8 802.1Q priority queues (see FIG. 9), and sequentially outputs the frame according to VLAN priority order. The PON bridge 100 learns a destination address of the output frame, stores the destination address in a filtering data base (FDB) (see FIGS. 9 and 10), and outputs the frame to a switch or network processor (NP) through the GMII.

When receiving an upstream frame from the switch through the GMII, the PON bridge 100 sees a destination address (DA) of the received upstream frame and determines the location of the DA. As a result of the determination, if the DA present in the FDB belongs to a network including the switch, the PON bridge 100 discards the received upstream frame. If the DA is not present in the FDB, the PON bridge 100 stores the received upstream frame in the maximum 8 priority queues according to a priority field of the VLAN tag of the received upstream frame and transmits a priority queue frame to the logical MAC layer 200 according to the priority field of the VLAN tag. Also, the PON bridge 100 learns source addresses from frames input from the switch or NP and records them to the FDB. This operation of the PON bridge 100 will be described in detail later with reference to FIGS. 9 and 10.

As described above, in order to support point-to-point communications between ONUs in the EPON while maintaining compatibility with the IEEE 802.1D bridge, the PON bridge 100 according to the present invention changes the LLID of a frame received from the ONU and the LLID corresponding to the DA of the received frame, thereby transmitting the received frame to lower layers through the logical MAC layer 200. At this time, when a frame to be transmitted is a broadcast frame, it is transmitted to lower layers through a separate broadcast logical MAC (e.g. LMO). In this case, a broadcast bit is set. At this time, there are logical MACs of (the number of LLIDs×2+1) and a frame format is changed to a format that is different from the Ethernet standards for shared LAN emulation (see FIG. 2). The NP or a L2/L3 switch can access upper layers through the GMII or a System Physical Interface (SPI).

The above-described function of the PON bridge 100 can be implemented as hardware as follows.

Figure 8:
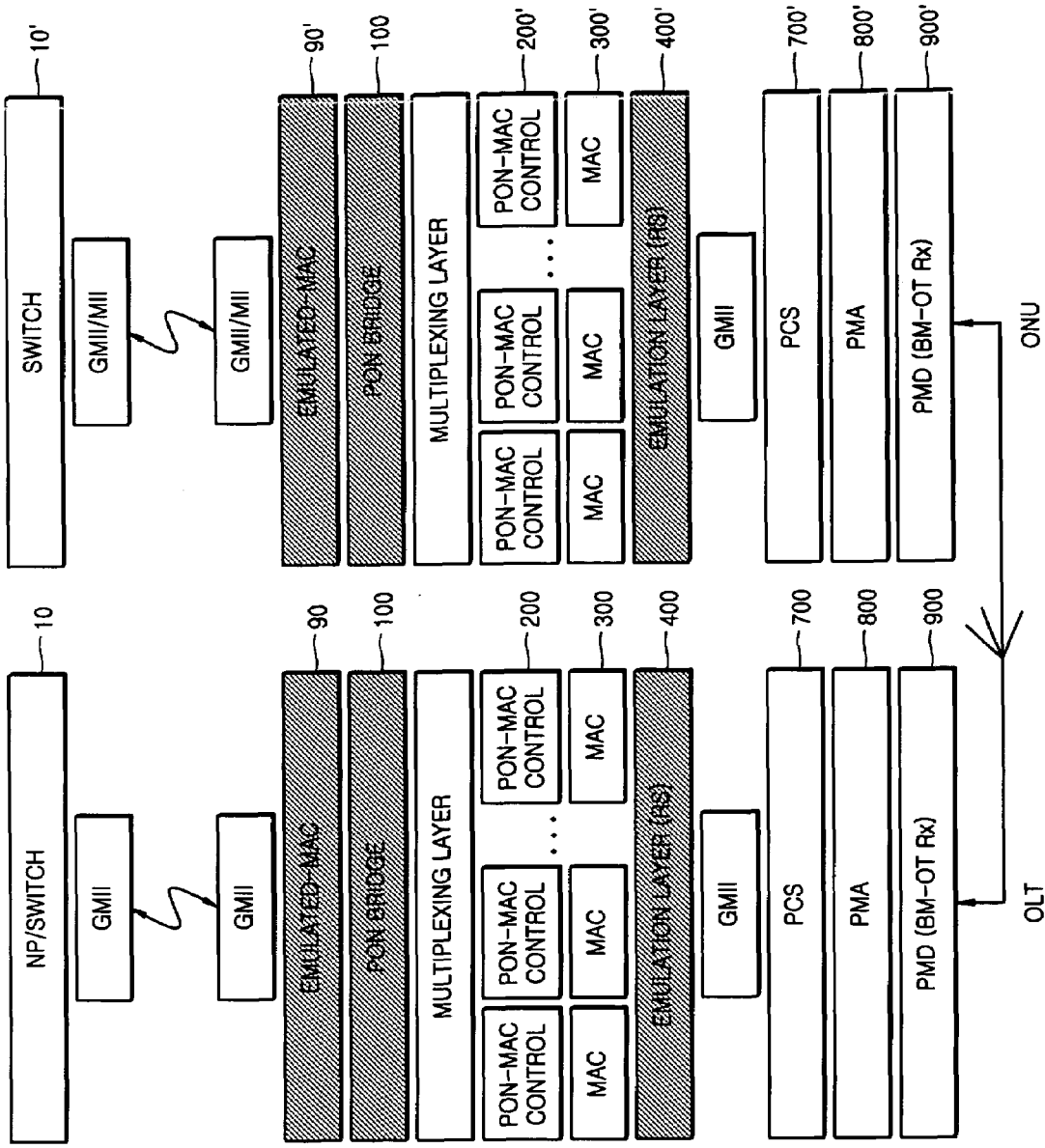
FIG. 8 illustrates the architecture of layers of an OLT and an ONU of an EPON system including the PON bridge according to a preferred embodiment of the present invention.

FIG. 8 illustrates the architecture of layers of an OLT and each of ONUs of the EPON system including the PON bridge 100 according to a preferred embodiment of the present invention. Referring to FIG. 8, the OLT and ONU of the EPON system are roughly divided into a physical layer and a data link layer.

The physical layer includes physical coding sublayers (PCS) 700 and 700', physical media attachments (PMA) 800 and 800', and physical media dependents (PMD) 900 and 900'.

The PCSs 700 and 700' use an 8B10B algorithm for line coding and have functions of code group synchronization and data transceiving with the logical MAC layer 200. The PMAs 800 and 800' have a serialize and de-serialize (SerDes) function, a clock and data restoration function, a PLL function, and a comma detection function for producing a code group of valid parallel 10 bits from serial data. The PMDs 900 and 900' have a 1.25 Gbps burst mode optical transceiving function. The PMDs 900 and 900' have a burst mode optical receiving function and a continuous mode optical transmitting function at the OLT side and have a burst mode optical transmitting function and a Continuous mode optical receiving function at the ONU side.

The data link layer includes emulation layers (or reconciliation sublayers: RS) 400 and 400', MAC sublayers 300 and 300', PON-MAC control sublayers 200 and 200', PON bridge sublayers 100 and 100', and emulated-MAC sublayers 90 and 90'. Here, data transceiving between the data link layer and the physical layer is performed through the GMII. The GMII complies with the interface standards that can support Ethernet frame processing at up to 1 Gbps.

The emulation layers 400 and 400' perform a CRC test on information included in a preamble of a frame received from the physical layer and extracts an LLID from the preamble, thus allowing an upper layer to perform MAC sublayer processing for each LLID. However, in case of the ONU side, the emulation layers 400 and 400' perform filtering only for a corresponding LLID and transmit the frame to the upper layer.

In data transmission, the emulation layers 400 and 400' receive a frame to which the LLID shown in FIG. 3 is attached from the PON-MAC control layer 200. The LLID is inserted into the $6^{th}$ and $7^{th}$ bytes of the preamble of the frame, the SFD is inserted into the $3^{rd}$ byte of the preamble, and a reserved word is inserted into the $1^{st}$, $2^{nd}$, $4^{th}$, and $5^{th}$ bytes of the preamble. A CRC value of 5 bytes from the SFD in the $3^{rd}$ byte of the preamble to the LLID in the $7^{th}$ byte of the preamble is calculated and the calculated CRC value is inserted into the $8^{th}$ byte of the preamble. As a result, the EPON preamble is created as shown in FIG. 2. The EPON preamble is inserted in front of the frame transmitted from the MAC sublayers 300 and 300' and transmitted to the physical layer through the GMII.

In the downstream direction, the MAC sublayers 300 and 300' perform frame check sequence (FCS) creation and inter frame gap (IFG) insertion with respect to MPCP control frames among Ethernet frames transmitted from the PON-MAC control sublayers 200 and 200' and perform management information base (MIB) counter management with respect to downstream frames. In the upstream direction, the MAC sublayers 300 and 300' provide to a CPU an FCS test, address filtering, and MIB counter management for upstream frames. As shown in FIG. 8, the MAC sublayers 300 and 300' and the PON-MAC control sublayers 200 and 200' are separately constructed for each LLID.

In case of the OLT side, the PON-MAC control sublayers 200 and 200' perform bandwidth assignment, scheduling, and other operations related to MAC control. The existing IEEE 802.3ah recommend MPCP to control transmission in a PON while conforming to Ethernet MAC frame transmission protocol. Consequently, the PON-MAC control sublayers 200 and 200' may be also called MPCP functioning portions.

The PON bridge sublayers 100 and 100' have basic bridge functions related to the EPON, create and manage a filtering address table of a destination MAC address and a VLAN ID for each PON-tag, and provide point-to-point communications between ONUs and VLAN multicasting in the EPON system. The operations of the PON bridge sublayers 100 and 100' will be described in detail with reference to FIGS. 9 and 10.

The emulated-MAC sublayers 90 and 90' have functions similar with those of the MAC sublayers 300 and 300', but mainly perform matching of upstream/downstream Ethernet frames, the FCS test, and pause frame processing.

Figure 9:
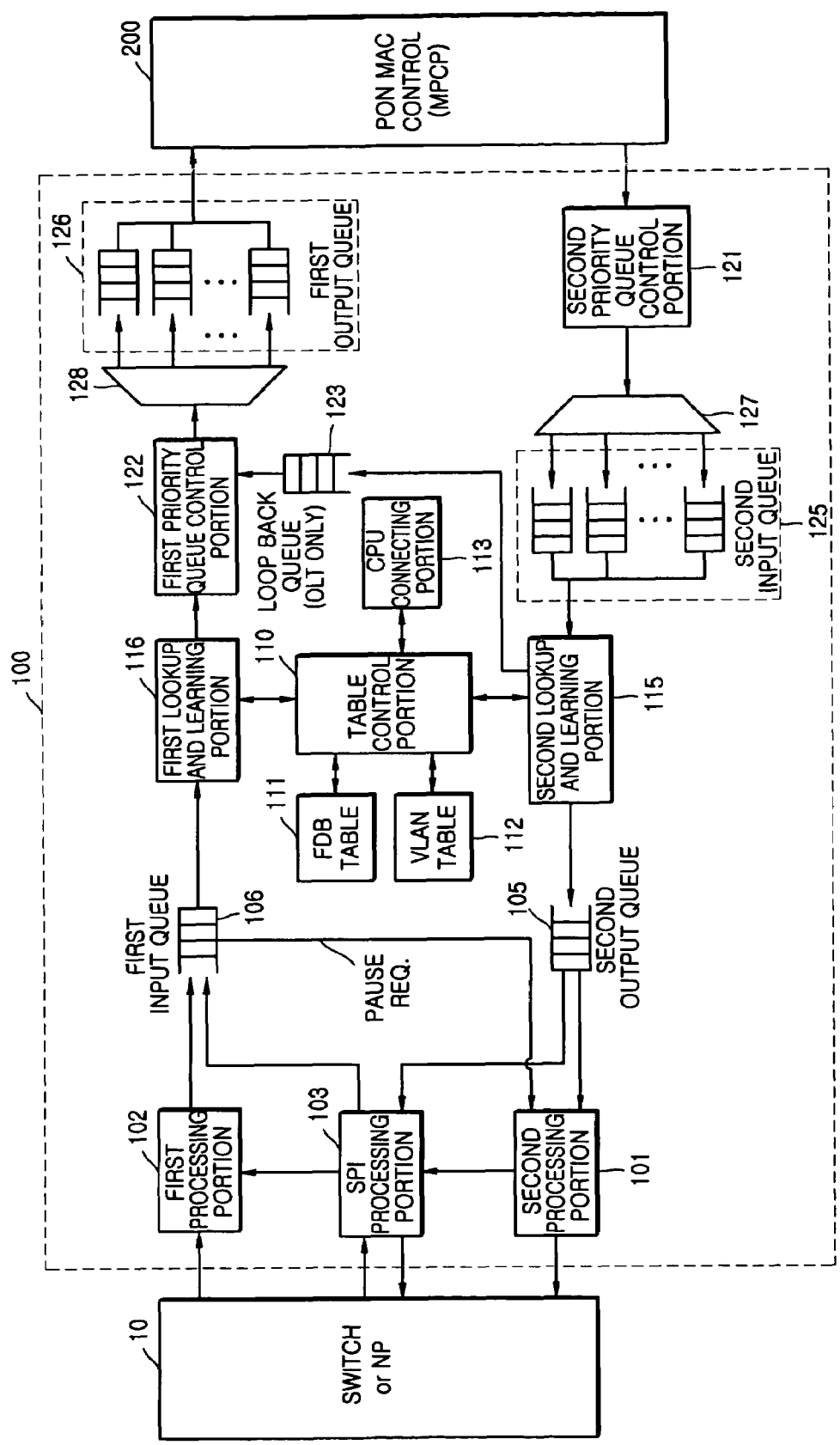
FIG. 9 is a detailed block diagram of a PON bridge sublayer of the OLT of the EPON system shown in FIG. 8 according to a preferred embodiment of the present invention.

FIG. 9 is a detailed block diagram of the PON bridge sublayer 100 of the OLT of the EPON system shown in FIG. 8 according to a preferred embodiment of the present invention. Here, an upper layer of the PON bridge suplayer 100 may be the NP or a L2/L3 switch 10. The PON bridge sublayer 100 can access the upper layer through the GMII or SPI.

Referring to FIG. 9, the PON bridge sublayer 100 according to the present invention is connected to its upper layer, i.e., the NP or switch 10 through a transmission MAC port and a receiving MAC port and connected to its lower layer, i.e., a PON-MAC sublayer 150 that performs the MPCP function.

Hereinafter, the detailed architecture of the PON bridge sublayer 100 will be described. First, a second processing portion 101 changes data of 32 bits into a GMII standard format signal of 8 bits in order to read data from a second output queue 105 and transmit the data to the upper layer, i.e., the NP or switch 10. When overflow occurs in a first input queue 106, the second processing portion 101 receives a signal PAUSE_REQ from the first input queue 106 and generates a pause frame towards the NP10 side. If overflow does not occur in the first input queue 106, the second processing portion 101 reads a frame from the second output queue 105 and transmits the frame to the NP10 side. The second processing portion 101 performs FCS creation with respect to the generated pause frame only when the pause frame is generated. If the first processing portion 101 includes the SPI, it transmits data to an SPI processing portion 103 in the SPI format.

The second output queue 105 is used to temporarily store the frame read from a second input queue 125, according to an 802.1Q priority field of the second lookup and learning portion 115. As a result of the lookup performed by the second lookup and learning portion 115, if the DA of the frame does not correspond to a location included in the ONU side, the second output queue 105 is used to store the frame.

A first processing portion 102 receives a frame from the NP10 side through the GMII or SPI, changes the received frame to data of 32 bits that can be processed internally, and performs the FCS test and frame matching on the received frame. The FCS test adopts CRC-32 that is used in a MAC layer of GB Ethernet. Received data is recorded in the first input queue 106. As a result of the FCS test performed in the first processing portion 102, if a CRC error is detected, the frame stored in the first input queue 106 is discarded. A frame discarding method is directed to changing the state of a control address of the first input queue 106 to the state in which the frame has not been recorded.

The first input queue 106 stores data frames input from the NP10 side for transmission. If at least one frame data is present in the first input queue 106, the first input queue 106 causes data processing to start by informing the first lookup and address learning portion 116 of a frame state. Also, when the amount of data frames stored in a buffer is high enough to cause overflow, the first input queue 106 generates the signal PAUSE_REQ towards the second processing portion 101 prior to a sufficient amount of time, thus making the second processing portion 101 generate the pause frame. Then the first input queue 106 calculates a FCS value for the pause frame, inserts the calculated FCS value at the end of the pause frame, and transmits the pause frame into which the FCS value is inserted to the NP10 side.

In the EPON, the LLID is 16 bits as shown in FIGS. 2 and 3 and assigned to an ONU by the OLT when the ONU is registered. Each ONU has at least two LLIDs. According to application of the LLID, 32, 64, or more LLIDs may be used. One of the upper bits of the LLID of 16 bits is used to indicate the anti-LLID. The anti-LLID is used in frame transmission in the downstream direction and means "all except for a specific LLID". For example, when the upper-second bit of the 16-bit LLID is used to indicate the anti-LLID, a value "1000000000000111" means "all except for LLID 7". As a result, all ONUs except for an ONU to which the LLID 7 is assigned can receive a corresponding frame.

The first lookup and learning portion 116 reads frame data from the first input queue 106 and looks up the DA of the frame data, thereby determining whether a corresponding MAC address is present in the ONU side or in the NP10 side. As a result of the lookup, if the corresponding MAC address is present in the ONU side, the first lookup and learning portion 116 attaches an appropriate LLID to the frame data and transmits the frame data to which the LLID is attached to a first output queue 126. At this time, if the corresponding MAC address is present in the NP10 side, the first lookup and learning portion 116 discards the frame according to bridge standards. Also, if the location of the DA has not yet been learned, the first lookup and learning portion 116 performs flooding, attaches the broadcast LLID to the frame data, and transmits the frame data to which the broadcast LLID is attached to the first output queue 126.

Also, the first lookup and learning portion 116 extracts a source address (SA) of an input frame and records the SA in a FDB table 111 through a table control portion 110. In other words, the first lookup and learning portion 116 records in the FDB table 111 the presence of the extracted SA in the NP10. When newly learned or already learned contents are re-recorded in the FDB table 111, they are marked with the fact that data is updated. Thus, it is possible to prevent a corresponding FDB entry from being removed due to aging processing performed by the CPU. Also, when a corresponding frame is a VLAN tagged frame, the first lookup and learning portion 116 reads frame data from the first input queue 106 and performs lookup of the DA and VLAN ID. When the VLAN ID received from the upper layer is the DA of the ONU side, the first lookup and learning portion 116 performs entry management for a VLAN table 112 based on the result of lookup of the DA and VLAN ID. Here, each of the entries constituting the FDB table 111 is such configured that it is automatically discarded if the SA has not been looked up for a predetermined amount of time. This characteristic is called aging and the predetermined amount of time can be programmed from 10 seconds to 1 million seconds.

The first output queue 126 is used for frames which have already been looked up and to which LLIDs are attached to wait for transmission to an MPCP 200. The first output queue 126 is composed of a plurality of priority queues.

A first priority queue control portion 122 reads a priority field of 3 bits included in an 802.1Q frame and stores through a MUX 128 a corresponding frame in a priority queue of the first output queue 126 corresponding to a priority value obtained from the read priority field.

Once a read signal from the MPCP 200 is input through the MUX 128, the first output queue 126 outputs data stored therein and transmits the data to a MUX (not shown) inside the MPCP 200.

The first priority queue control portion 122 determines whether at least one frame is present in each of the priority queues. If at least one frame is present in each of the priority queues, the first priority queue control portion 122 stores in a separate queue the number of frames of each of the priority queues, the size of the first frame of each of the priority queues, and a header of the first frame of each of the priority queues and directs the first output queue 126 to provide such information to the MPCP 200. Such information is used when the MPCP 200 performs transmission scheduling. When such operations of the first priority queue control portion 122 are adopted in a MPCP slave and a PON slave of an ONU, such information is used to determine whether it is possible to transmit a frame that has waited for transmission in the first output queue 126 for a remaining grant period.

The second input queue 125, like the first output queue 126, is composed of a plurality of priority queues.

The second priority queue control portion 121 reads the priority field of 3 bits included in the 802.1Q frame input from the MPCP 200 and stores through a MUX 127 a corresponding frame in a priority queue of the second input queue 125 corresponding to a priority value obtained from the priority field. Then, the second priority queue control portion 121 determines whether at least one frame is present in each of the priority queues. If at least one frame is present in each of the priority queues, the second priority queue control portion 121 informs the second lookup and learning portion 115 of the presence of at least one frame in each of the priority queues and causes the first lookup and learning portion 116 to read the frame from each of the priority queues.

When a frame is present in the second input queue 125, the second lookup and learning portion 115 looks up DA data from the FDB table 111 through the table control portion 110. Based on the result of the lookup, the second lookup and learning portion 115 determines whether a corresponding DA is present in the NP10 side or the ONU side. When the corresponding DA is present in the ONU side, the second lookup and learning portion 115 detects the LLID. As a result of the lookup, when the corresponding DA is present in the NP10 side, the second lookup and learning portion 115 removes the LLID and transmits the corresponding frame to the second output queue 105. Also, when the corresponding DA is present in the ONU side, the second lookup and learning portion 115 changes the LLID of the corresponding frame and the LLID of a corresponding destination ONU and transmits the corresponding frame to a loop back queue 123. In case of doubt as to where the corresponding DA is present, the LLID of the corresponding frame is detached from the corresponding frame and the corresponding frame is transmitted to the NP10 side. At the same time, an anti-LLID of the LLID of the corresponding frame is attached to the corresponding frame and the corresponding frame is transmitted to the MPCP 200. Such operations are based on the same principle as flooding of the existing bridge.

After that, the second lookup and learning portion 115 detects a LLID in which a corresponding MAC address is present, based on the LLID included in the frame received from the MPCP 200 and the SA of the received frame. As such, the operations of the second lookup and learning portion 115, i.e., determining whether stations having a predetermined MAC address are present in the NP10 side or the ONU side corresponding to the LLID, creating one entry, and storing the entry in the FDB table 111 (e.g., recording information on the presence of the corresponding SA in the ONU side and the corresponding LLID value) are referred to as SA learning. At this time, the second lookup and learning portion 115 marks the update of the SA in the FDB table 111, thus preventing a corresponding entry from being removed due to aging performed by the CPU.

At this time, if a frame is broadcast by the ONU side, the second lookup and learning portion 115 attaches an anti-LLID of the source ONU to an LLID of a corresponding frame and transmits the LLID of the corresponding frame to the loop back queue 123. At the same time, the second lookup and learning portion 115 transmits to the second output queue 105 the frame from which the LLID is removed. The second lookup and learning portion 115 reads the VLAN ID and the LLID from the frame input from the MPCP 200 and records the VLAID ID and the LLID in the VLAN table 112 through the table control portion 110. Also, the second lookup and learning portion 115 looks up the VLAN ID for each frame and learns the VLAN ID of each ONU. As a result of the learning, if an ONU desires to transmit a frame to another ONU included in the same VLAN group, the second look up and learning portion 115 of the OLT looks up the VLAN ID for the LLID, attaches a broadcast LLID to the VLAN ID, and broadcasts the VLAN ID to the ONU.

Figures 11, 12:
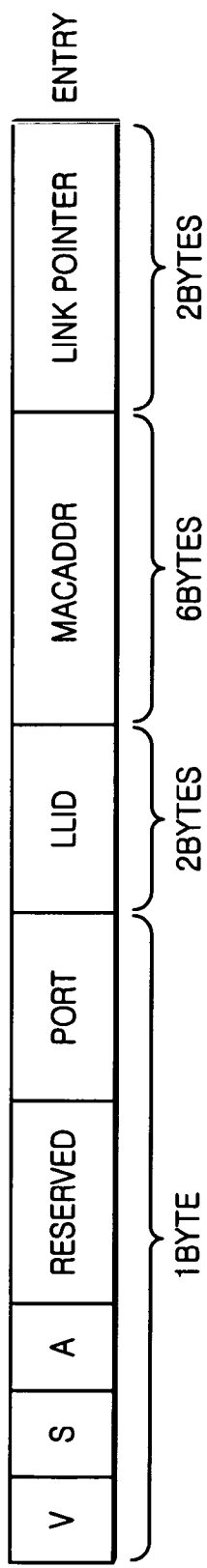
FIG. 11 illustrates a structure of each of entries forming a FDB table in the PON bridge of the OLT of the EPON system.
FIG. 12 illustrates a structure of each of entries forming a VLAN table in the PON bridge of the OLT of the EPON system.

The FDB table 111 stores location information of all MAC addresses and the stored location information is read or recorded by the first lookup and learning portion 116 and the second lookup and learning portion 115. Also, the stored location information is initialized by the CPU and periodically read or recorded for aging. The entry format of the FDB table 111 is shown in FIG. 11.

The loop back queue 123 is present only in the PON bridge of the OLT. In the loop back queue 123, frames, which are received from an ONU and are to be transmitted to another ONU, are stored. The LLID of the destination ONU is attached in front of theses frames.

A CPU connecting portion 113 manages interfacing with the CPU and performs initialization and aging processing on the FDB table 111. The SPI processing portion 103 manages SPI interfacing between the PON bridge sublayer 100 and the NP or switch 10.

Figure 10:
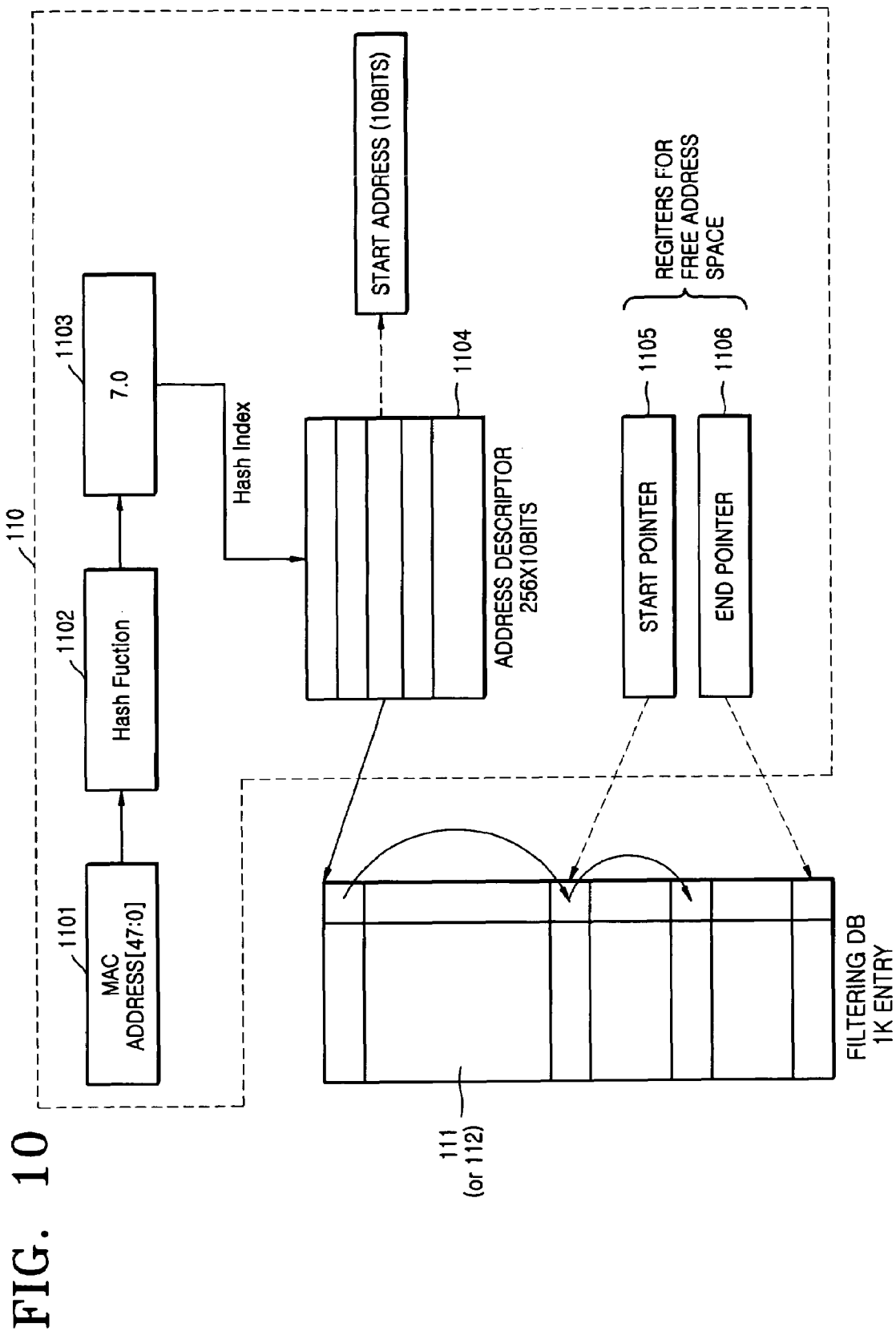
FIG. 10 is a view for explaining the operation of a table control portion shown in FIG. 9.

FIG. 10 is a view for explaining the operation of the table control portion 110 shown in FIG. 9. The table control portion 110 performs address management for the FDB table 111 and the VLAN table 112, in response to control of the first lookup and learning portion 116 and the second lookup and learning portion 115 inside the PON bridge. The address management for the FDB table 111 is performed as follows.

Referring to FIG. 10, the PON bridge of the OLT includes the FDB table 111 having 1 KB-entries. Once a MAC address 1101 is input to the table control portion 110, it is used as an input to a hash function unit 1102, and thus the hash function unit 1102 produces a hashing output value 1103 of 8 bits that is called a hash index (hereinafter, the hashing output value 1103 will be referred to as a hash index 1103). The hash index 1103 indicates the address of a buffer that is called an address descriptor 1104. The buffer has a size of 256×10 bits. The address descriptor 1104 has 256 10-bit start addresses. The 10-bit start addresses indicate addresses of 1,024 entries included in the FDB table 111. The structure of each of the entries forming the FDB table 111 is as follows.

FIG. 11 illustrates the structure of each of the entries forming the FDB table 111 in the PON bridge of the OLT of the EPON system, and FIG. 12 illustrates the structure of each of the entries forming the VLAN table 112 in the PON bridge of the OLT of the EPON system. Referring to FIGS. 11 and 12, the FDB table 111 and the VLAN table 112 each are composed of entries of a total of 11 bytes. Here, the structure of each of the entries forming the VLAN table 112 is the same as that of each of the entries forming the FDB table 111 shown in FIG. 11, except that the VLAN ID of 2 bytes is included instead of the LLID of 2 bytes. Thus, to avoid repetitive explanation, the detailed description of the structure of each of the entries forming the VLAN table 112 will not be described.

Referring to FIG. 11, the first byte of an entry forming the FDB table 111 is composed of 3 state bits, 3 reserved bits, and 3 port selection bits and is followed by an LLID of 2 bytes, a MAC address MACADDR of 6 bytes, and then a link pointer of 2 bytes.

The 3 state bits of the first byte of the entry are composed of a valid bit V, a static bit S, and an aging bit A. The valid bit V indicates whether the entry is valid. The static bit S indicates an area that is initially set by the CPU and not automatically updated. The aging bit A indicates that the entry has been accessed by learning or lookup during a predetermined amount of time, thus preventing the CPU from automatically updating the entry.

In general, hashing the MAC address MACADDR may produce the same result. Consequently, numerous MAC addresses may be mapped to the same hash index. In other words, collision between MAC addresses may be caused. Thus, the present invention suggests the architecture that can provide learning or lookup functions in spite of collision between MAC addresses. In other words, the MAC address MACADDR of 48 bits shown in FIG. 11 is mapped only to the address descriptor 1104 that is a total of 256. The 10 bits of the address descriptor 1104 indicates the location of each of the 1 KB-entries of the FDB tables 111. The last 2 bytes of the entry (i.e., the link pointer) are used as an offset address that binds the next entry in the linked list format when collision occurs between MAC addresses. The start address of the linked list may be set by an external start point register of 10 bits (1105 of FIG. 10). The last address of the linked list may be set by an external end pointer register (1106 of FIG. 10). In other words, in the present invention, entry areas, which will be directly controlled by the address descriptor 1104, are first set and the remaining entry areas are used for the linked list. Thus, it is possible to perform learning or lookup in spite of collision between MAC addresses. Here, the start pointer register 1105 and the end pointer register 1106 are programmed by the CPU, and the address descriptor 1104 is initialized by the CPU.

As described above, the present invention proposes a PON bridge layer that is required to support both point-to-point communications between ONUs and VLAN multicasting while complying with the IEEE 802.1D standards in the EPON. When the PON bridge is implemented by an application-specific integrated circuit (ASIC) or a field-programmable gate array (FPGA), it is possible to simplify a hardware device, realize a low-cost device, and improve the cost competitiveness of a system.

The present invention also can be realized in the forms of codes in a recording medium, and the recording medium can be read by a computer. The recording medium includes various recording devices for storing data that the computer system can read. Such recording media are ROM, RAM, CD-ROM, magnetic tape, floppy disk, and optical data storage, but the present invention is not limited thereto. Also, transmissions via the Internet (e.g., carrier wave) can be included in the recording media. The recording medium can be distributed in a computer system connected to a network, and can be stored and operated in the forms of codes read through the distributed computer system.

As described above, the present invention can support point-to-point communications between ONUs when the existing Ethernet protocol is used in the Ethernet-based PON and solve a problem associated with compatibility with 802.1D. In other words, by using the GMII or SPI, it is possible to access numerous common switches or NPs. The present invention makes it possible to support priority-tagged upstream and downstream frames and establish VLAN in the Ethernet-based PON by supporting VLAN multicasting for the PON bridge function. Also, since only the frames that are looked up from the FDB table of the PON bridge are transmitted to the PON link, it is possible to improve the efficiency of the PON link.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A communication apparatus comprising:
an emulation sublayer, which extracts logical link identification (LLID) information from a preamble included in a frame;
a passive optical network (PON) bridge sublayer, which creates and manages a filtering address table for a destination media access control (MAC) address and a virtual LAN (VLAN) ID in response to the LLID information, determines whether to forward the frame to the upper layer of the PON bridge sublayer or to reflect the frame toward an optical network unit (ONU), and provides point-to-point communications between a plurality of ONUs connected to the EPON and VLAN multicasting; and
a PON-MAC control sublayer, which is connected to the upper layer of the PON bridge sublayer and performs bandwidth assignment, scheduling, and MAC control; and a MAC sublayer, which is connected between the PON-MAC control sublayer and the emulation sublayer, performs, in a downstream direction, frame check sequence (FCS) creation and inter frame gap (IFG) insertion with respect to multi-point control protocol (MPCP) control frames among frames received from the PON-MAC control sublayer, and management information base (MIB) counter management with respect to downstream frames, and performs, in an upstream direction, a FCS test, address filtering, and MIB counter management with respect to the upstream frames.

2. The communication apparatus of claim 1, wherein the PON-MAC control sublayer comprises with the MPCP to control PON transmission while conforming to an Ethernet MAC frame transmission protocol.

3. The communication apparatus of claim 1, wherein the emulation sublayer positions a start frame delimiter (SFD) in front of the LLID included in the frame received from the PON-MAC control sublayer in data transmission, calculates a CRC value of the preamble, inserts the calculated CRC value in the preamble to create an EPON preamble.

4. The communication apparatus of claim 3, wherein the EPON preamble is comprised of SFD data, reserved data, LLID data, and CRC data, each of which has a predetermined number of bytes.

5. A communication apparatus comprising:
an emulation sublayer, which extracts logical link identification (LLID) information from a preamble included in a frame;
a passive optical network (PON) bridge sublayer, which creates and manages a filtering address table for a destination media access control (MAC) address and a virtual LAN (VLAN) ID in response to the LLID information, determines whether to forward the frame to the upper layer of the PON bridge sublayer or to reflect the frame toward an optical network unit (ONU), and provides point-to-point communications between a plurality of ONUs connected to the EPON and VLAN multicasting, wherein the PON bridge sublayer comprises:
a first processing portion, which changes the format of a downstream frame received from the upper layer to a predetermined internal data format and performs the FCS test and frame matching on the changed frame;
a first input queue, which stores the frame received through the first processing portion;
a first lookup and learning portion, which performs either destination address lookup or VLAN ID lookup with respect to the frame stored in the first input queue;
a first output queue, which stores the frame received from the first lookup and learning portion, according to priority, and transmits the frame to the PON-MAC control sublayer;
a second input queue, which stores an upstream frame received from the PON-MAC control sublayer according to priority;
a second lookup and learning portion, which performs either destination address lookup or VLAN ID lookup with respect to the frame stored in the first input queue and detects a destination address of the frame and the LLID of the frame;
a filtering database table in which a result of the destination address lookup is stored;
a VLAN ID table in which a result of the VLAN ID lookup is stored;
a table control portion, which performs data recording and management with respect to the filtering database table and the VLAN ID table in response to the control of the second lookup and learning portion and the first lookup and learning portion;
a second output queue, which receives the frame stored in the first input queue through the first lookup and learning portion and stores the received frame; and
a second processing portion, which changes the format of the frame stored in the first output queue to a predetermined data format and transmits the changed frame to the upper layer.

6. The communication apparatus of claim 5, wherein the PON bridge sublayer further comprises a loop back queue which stores a frame that is transmitted from a ONU to another ONU, between the first lookup and learning portion and the second input queue.

7. The communication apparatus of claim 6, wherein the frame transmitted between ONUs includes an LLID indicating a destination ONU.

8. The communication apparatus of claim 5, wherein the first lookup and learning portion and the second lookup and learning portion prevent the filtering database table and the VLAN ID table from being affected by aging that is performed by a CPU, by marking data update in the filtering database table and the VLAN ID table when storing learned contents.

9. The communication apparatus of claim 5, wherein the first input queue generates a predetermined control signal when overflow occurs, and causes the first processing portion to generate a pause frame.

10. The communication apparatus of claim 5, wherein when at least one frame is present in a plurality of priority queues forming the first output queue, the first output queue stores in a separate queue the number of all of the frames present in each of the priority queues, the size of the first frame present in each of the priority queues, and a header of the first frame present in each of the priority queues.

* * * * *